United States Patent
Eichenhofer et al.

[11] 3,892,805
[45] July 1, 1975

[54] PRODUCTION OF AZINES

[75] Inventors: Kurt-Wilhelm Eichenhofer, Leverkusen; Reinhard Schliebs, Cologne, both of Germany

[73] Assignee: Bayer Aktiengesellschaft, Leverkusen, Germany

[22] Filed: Feb. 11, 1974

[21] Appl. No.: 441,548

[30] Foreign Application Priority Data
Feb. 24, 1973 Germany............................ 2309421
Oct. 2, 1973 Germany............................ 2349490

[52] U.S. Cl............................................. 260/566 B
[51] Int. Cl............................................. C07c 119/00
[58] Field of Search ................................ 260/566 B

[56] References Cited
OTHER PUBLICATIONS
King et al., J. A. C. S., Vol. 52, pp. 1493–98, (1930).

*Primary Examiner*—Leon Zitver
*Assistant Examiner*—Gerald A. Schwartz
*Attorney, Agent, or Firm*—Burgess, Dinklage & Sprung

[57] ABSTRACT
A process for the production of an azine of the formula

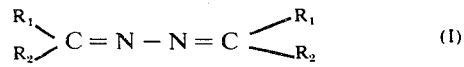

in which
$R_1$ and $R_2$ each independently is hydrogen, an alkyl or cycloalkyl radical with up to about 12 carbon atoms, a phenyl radical or a hydrocarbon radical of up to about 12 carbon atoms containing a benzene ring, or
$R_1$ and $R_2$ together form a ring with the carbon atom to which they are attached, comprising reacting a carbonyl compound of the formula

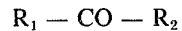

(II)

with ammonia and at least one peroxosulphuric acid compound selected from the group consisting of peroxomonosulphuric acid, peroxodisulphuric acid, and the ammonium alkali metal and alkaline earth metal salts thereof. Advantageously the reaction is effected in the presence of silver or rhodium as catalyst.

7 Claims, No Drawings

PRODUCTION OF AZINES

The present invention relates to the production of azines from carbonyl compounds, ammonia and a peroxosulphuric acid or salt.

It is known from Berichte Vol. 42 (1909) page 1839 that salts of peroxomonosulphuric acid quantitatively liberate nitrogen from aqueous ammonia solutions in the presence of a catalytic quantity of silver nitrate or silver sulphate, and that they form nitrates with ammonium salt solutions. JACS Vol. 52 (1930) page 1493 teaches this also happens with salts of peroxodisulphuric acid.

In accordance with the present invention there is provided a process for the production of an azine of the formula

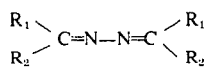

in which
$R_1$ and $R_2$ each independently is hydrogen, an alkyl or cycloalkyl radical with up to about 12 carbon atoms, a phenyl radical or a hydrocarbon radical of up to about 12 carbon atoms containing a benzene ring, or
$R_1$ and $R_2$ together form a ring with the carbon atom to which they are attached, comprising reacting a carbonyl compound of the formula $$R_1 - CO - R_2 \qquad (II)$$

with ammonia and at least one peroxosulphuric acid compound selected from the group consisting of peroxomonosulphuric acid, peroxodisulphuric acid, and the ammonium alkali metal and alkaline earth metal salts thereof. Desirably the reaction is effected in the presence of silver or rhodium as catalyst.

Advantageously, $R_1$ and $R_2$, which may be the same or different, represent hydrogen or linear or branched alkyl or cycloalkyl radicals containing up to 12 carbon atoms, or phenyl radicals or $C_1$ to $C_{12}$ hydrocarbon radicals containing a benzene ring, these radicals optionally containing substituents that are stable under the reaction conditions, such as methyl, methoxy, chlorine, fluorine or nitro groups, or $R_1$ and $R_2$ together represent a linear or branched $C_3$ to $C_{11}$ alkene radical, or $R_1$ and $R_2$ together can be part of a $C_5$ to $C_8$ ring system optionally containing one or more of O, N, S, P, Si atoms.

In cases where one of the radicals $R_1$ or $R_2$ is a hydrogen atom, the derivative (II) is an aldehyde of formula $R_1CHO$ and the azine (I) is an aldazine. In cases where neither of the radicals $R_1$ or $R_2$ is a hydrogen atom, the derivative (II) is a ketone and the azine (I) is a ketazine.

Examples of aldehydes (II) which are suitable for the purposes of the invention are formaldehyde, acetaldehyde, propionaldehyde, butyraldehyde, isobutyraldehyde, valeraldehyde, benzaldehyde and p-chlorobenzaldehyde, pivalaldehyde, α-methyl-n-butyraldehyde, n-caproaldehyde, furfural, hexahydrobenzaldehyde, 1,2,3,6-tetrahydrobenzaldehyde, pelargonaldehyde, 5-methylfurfurale, phenylacetaldehyde, m-tolualdehyde, o-tolualdehyde, o-chlorobenzaldehyde, capraldehyde, phenoxyacetaldehyde, m-methoxybenzaldehyde, p-methoxybenzaldehyde, palmitaldehyde, piperonal, o-aminobenzaldehyde, o-nitrobenzaldehyde, phthalaldehyde, p-fluorobenzaldehyde, cyano-4-dimethyl-2,2-butyraldehyde, β-fluoroacetaldehyde, pyridoine.

Examples of ketones which are suitable for the purpose of the invention are acetone, 2-butanone, 2-pentanone, diethylketone, pinacolone, acetylacetone, dibutylketone, cycloheanone, and methylphenylketone, methylisopropylketone, methylcyclohexylketone, dicyclohexylketone, 2-hexanone, 2-heptanone, benzophenone, cycloheptanone, cyclopentanone, 2-methylcyclopentanone, 3-methylcyclohexanone, β-thujone, 1-menthone, methyl-2-thienylketone, 2-hydroxyacetophenon, methyl-o-tolylketone, isobutyrophenone, carvone, m-chloroacetophenone, m-methoxyacetophenone, 2-aceto-p-cymene, triacetonamin, oxazolidone-(4), 3-acetyl-chromane, N-methylα-pyridone.

The reaction gives high yields, particularly when no catalyst is used, and especially in cases where the peroxomonosulphuric acid or its salt is introduced continuously during the reaction in as fine a distribution as possible. The process is carried out by reacting peroxomonosulphuric acid or its salts with a mixture of the carbonyl compound (II) and ammonia in aqueous solution.

The reaction differs considerably from conventional processes for oxidizing ammonia with hydrogen peroxide or hydroperoxides in which the presence of nitriles is required (DOS 2,127,229). These peroxo compounds are unable to oxidize ammonia, even when catalytic quantities of silver or rhodium salts are used.

The new reaction can be illustrated by the following reaction equations:

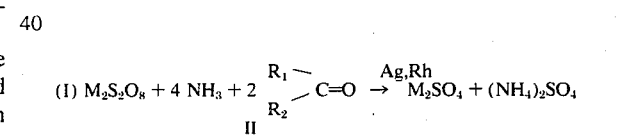

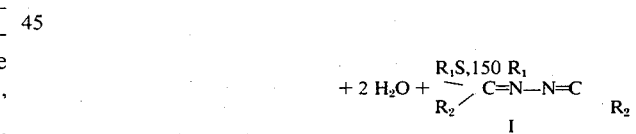

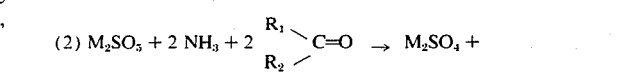

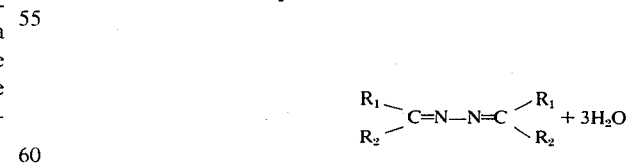

in which M is a metal of the Ist and IInd Main Groups or $NH_4^+$.

The process is performed by reacting a salt of peroxodisulphuric acid or peroxomonosulphuric acid with a mixture of the carbonyl compound (II) and ammonia in aqueous solution, optionally in the presence of a catalytic quantity of silver or rhodium.

The salts of peroxomonosulphuric acid can be the peroxomonosulphates $MHSO_5$ and $M_2SO_5$, where M represents especially metals of the Ist and IInd Main Group of the Periodic System and ammonium. Examples of these sulphates include $NaHSO_5$, $KHSO_5$, $(NH_4)HSO_5$, $Na_2SO_5$, $K_2SO_5$, $(Na, NH_4)(HSO_5)_2$, $NaKSO_5$. The salts of peroxodisulphuric acid can be the peroxodisulphates $M_2S_2O_8$ and $MHS_2O_8$ where M has the meaning as defined above. Examples of these sulphates include $Na_2S_2O_8$, $K_2S_2O_8$ and $(NH_4)_2 S_2O_8$. Peroxodisulphuric acid ($H_2S_2O_8$) can be used either in pure form or in the form of a solution in sulphuric acid. The concentration of the peroxodisulphate solution can be between about 0.01 and 3 mole/l and is preferably between about 0.1 and 2 mole/l. Potassium peroxodisulphate is used in solid form or in the form of an aqueous suspension. They can be used in pure form either as solids or in the form of an aqueous solution additionally containing a sulphuric acid salt of the Ist Main Group ($KHSO_4$, $Na_2 SO_4$, $NH_4HSO_4$) or of ammonium. Peroxomonosulphuric acid ($H_2SO_5$) can be used in pure form or in the form of a solution in sulphuric acid. The concentration of the peroxomonosulphate solution can be between about 0.01 mole of $SO_5^{2-}/l$ and supersaturated solutions, of the kind formed for example in accordance with German Auslegeschrift 1,127,878 or German Pat. No. 1,240,832.

The preferred metal salts are those of ammonium, potassium and sodium in the form of hydrogen peroxomonosulphate ($HSO_5$)-solutions.

The peroxodisulphate solution can actually contain the carbonyl compound and/or ammonia before the reaction without the stability of the solution being affected in any way. For example, the sodium salts can be obtained from the ammonium salts by reacting 2 moles of sodium hydroxide per mole of ammonium peroxodisulphate in addition to 2 moles of ammonia.

The acid protons formed during the reaction according to equation (1) can be bound by ammonia acting as the base. However, it is advantageous in cases where the process is carried out with peroxodisulphates, to add inorganic bases which are more strongly basic than ammonia, for example the hydroxides or carbonates of sodium, potassium or calcium. The base can have the same metal ion as the peroxodisulphate salt used, for example NaOH or $Na_2CO_3$ with $Na_2S_2O_8$. The organic base can be added to the mixture of ammonia/carbonyl compound (II) or to the peroxodisulphate salt solution. Where diammonium peroxodisulphate is used, the molar ratio of $(NH_4)_2S_2O_8$ to inorganic base can be between about 1:0,1 and 1:10, better still between about 1:2 and 1:5 and preferably between about 1:3 and 1:4.

When disodium peroxodisulphate is used, the molar ratio of $Na_2S_8O_8$ to inorganic base can be between about 1:0.01 and 1:10, better still between about 1:0.1 and 1:3 and preferably between about 1:0.5 and 1:2. The concentration of the inorganic base is controlled by the peroxodisulphate concentration. The bases can be used either in solid form or in the form of an aqueous concentrated solution of a standard concentration, for example sodium hydroxide in a 50 % solution.

Ammonia is used in the form of its aqueous solutions in concentrations of about 5 to 25%. It is advantageous to introduce gaseous ammonia in undiluted form during the reaction so that it is absorbed by the reaction mixture. The molar ratio of ammonia to peroxodisulphate or peroxomonosulphate can be between about 2:1 and 200:1, better still between about 2:1 and 150:1 and preferably about 3:1 to 30:1. The preferred range is about 10:1 to 100:1 for peroxodisulphate and about 3:1 to 10:1 for peroxomonosulphate The ratio includes ammonia which may have to be used to neutralize the acid protons of the salts $MHSO_5$, the acid salts of sulphuric acid, peroxomonosulphuric acid $H_2SO_5$, peroxodisulphuric acid $H_2S_2O_8$ and their solutions in sulphuric acid.

The carbonyl compounds (II) are used either in liquid or solid form. The molar ratio of carbonyl compound (II) to peroxodisulphate or peroxomonosulphate can be between about 1:1 and 20:1, better still between about 2:1 and 15:1 and preferably between about 3:1 and 10:1. It makes no difference to the process whether the carbonyl compound (II) is miscible with water. It is also possible to use the condensation products of the carbonyl compounds (II) with ammonia, providing they are stable under the prevailing conditions. Examples of the products are methyl phenyl ketimine and isobutyraldimine.

When the reaction is carried out in the presence of catalysts, particularly in the case of the reaction of peroxodisulphates, it is possible to use silver of rhodium both in elemental form and in the form of their compounds as the catalyst. The catalytic effect is by no means confined to the presence of elemental metal or solid compound. Accordingly, it can be assumed that the metals act in their ionogenic form. This is also borne out by the fact that the metals can be used in a variety of different forms and compounds which can be salt-like, non-salt-like or complex in character. Thus, it is possible to use oxides, halides, cyanides, carbonates, salts of oxyacids, aliphatic and aromatic carboxylic acids and alkyl or aryl sulphonic acids. The valence of the silver and rhodium in the compounds or complexes is not of any importance. In the context of the invention, the term silver or rhodium is used in the generic sense specified above. In the following description, reference is only made to silver which has proved to be the most effective metal. What is said in the following in connection with silver also applies to rhodium.

The silver compounds are added to the ammonia/carbonyl compound (II) mixture either in solid form or in the form of a dilute aqueous solution containing about 0.01 to 1 mole of Ag per liter. The silver compounds can also be applied directly to a supporting substance or incorporated into the lattice of a supporting substance Examples of suitable supports include silicate materials such as zeolites or ion-exchanging resins. The molar ratio of silver or silver ions to peroxodisulphate or peroxomonosulphate can be between about $10^{-7}:1$ and $10^{-1}:1$, better still between about $10^{-5}:1$ and $10^{-2}:1$ and preferably between about $10^{-5}:1$ and $10^{-3}:1$. The same ranges also apply as regards the quantities of silver applied to supporting substances.

The reaction mixture should be stirred intensively. The reaction temperature can be in the range of about $-10°$ to 70°C, better still in the range of about 10° to 60°C and preferably in the range of about 10° to 50°C.

The reaction can be carried out either at atmospheric pressure or, if an increase in the concentration of ammonia is required, under a pressure of up to 3 atmospheres. However, the process is preferably carried out at atmospheric pressure.

The peroxodisulphate solution is added during a period ranging from about 5 minutes to 5 hours. The time of addition is determined by the dissipation of the heat of reaction in the preferred temperature range. If the peroxodisulphate solution is added quickly, the reaction can become violent. The peroxodisulphate solution is preferably added over a period of about 0.5 to 3 hours. When no catalyst is used, the peroxodisulphate solution is continuously added during the reaction in as fine a distribution as possible.

The total reaction time can fluctuate within wide limits and is determined by the concentration of the reactants, by the temperature and by the addition time of the peroxodisulphate or peroxomonosulphate solution. The reaction takes place much more quickly in concentrated solutions, and with a large excess of ammonia and carbonyl compound (II), than in dilute solutions. The reaction time can be between about 0.5 hours and 2 days. In the preferred concentration range of the reactants, the reaction time is between about 2 and 24 hours for peroxodisulphate and between about 5 minutes and 1 hour for peroxomonosulphate. The reaction time may optionally be influenced by adding catalysts of the kind referred to above.

The yield is not increased to any appreciable extent by the addition of salts such as sulphates, chlorides, fluorides, nitrates, acetates and benzoates of sodium, lithium, potassium and ammonium. Salts such as those of nitrilotetra-acetic acid, 2,2'-dipyridyl, acetylacetonate or pyridine, which are able to form complexes also have a small but positive effect upon the yield of azine (I).

In some cases, for example when ammonium chloride is added, as described in German Offenlegungsschrift 2,349,490, azines and diaziridines (III) are formed alongside one another:

Additions of salts of the transition metal elements or of thallium in concentrations corresponding to that of the silver have only a limited effect. If the silver is replaced by these metal ions, azine (I) is only formed in very small quantities less than 5% of the theoretical. One exception is the element rhodium.

The reaction is over when an equivalent quantity of the reaction mixture treated with a solution of potassium iodide in sulphuric acid liberates less than 0.1% of the theoretically calculated quantity of iodine, so indicating that the peroxodisulphate or peroxomonosulphate has been consumed:

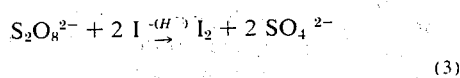

(3)

The iodine precipitated is titrated with $n/10$ thiosulphate solution.

The azines can be determined quantitatively by boiling an equivalent quantity of the mixture in sulphuric acid solution until no more carbonyl compound (II) can be detected, neutralizing the acid solution with an excess of solid sodium hydrogen carbonate and titrating the hydrazine liberated with $n/10$ iodine solution:

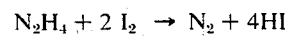

(3)

This method can only be applied if no more peroxodisulphate or peroxomonosulphate can be detected. If by contrast the peroxodisulphate or peroxomonosulphate is still present in a relatively large quantity, hydrazine determination can be carried out semi-quantitatively by the foregoing process but without boiling the acid solution. It is also possible to use the quantitative methods of gas chromatography and proton nuclear resonance.

The azines obtained by the process according to the invention are valuable known intermediate products for organic syntheses. In addition, hydrazine can be obtained from them by hydrolysis and removal of the ketone or aldehyde. The sulphate mixtures obtained by the process according to the invention can be processed for example into sodium sulphate.

Unless otherwise stated, all percentages quoted in the specification and claims relate to percent by weight.

The process according to the invention is illustrated in the following Examples, wherein the tests described were carried out in suitably dimensioned glass reactors equipped with a magnetic stirrer, an internal thermometer, a dropping funnel, a gas inlet pipe and a condenser. The compounds were characterized by spectroscopic methods and the azine yield determined by the method described above.

EXAMPLE 1

A mixture of 22.8 g of diammonium peroxodisulphate (0.1 mole) dissolved in 100 ml. of water and 14 g of sodium hydroxide (0.35 mole) dissolved in 100 ml. of water, was added dropwise over a period of 1.5 hours at 31°C to a mixture of 200 ml. of concentrated ammonia (2.6 moles), 13.2 g of acetaldehyde (0.3 mole) and 1 ml. of $n/10$ silver nitrate solution ($10^{-4}$ mole). After standing for 16 hours at room temperature, the tritrimetric yield amounted to 0.0405 mole of methyl aldazine, corresponding to 40.5 % of the theoretical yield.

EXAMPLE 2

A mixture of 22.8 g of diammonium peroxodisulphate (0.1 mole) dissolved in 100 ml. of water and 16 g of sodium hydroxide (0.4 mole) dissolved in 100 ml. of water was added dropwise over a period of 2.5 hours at 30°C to a mixture of 200 ml. of concentrated ammonia (2.6 moles), 29.4 g of cyclohexanone (0.3 mole) and 1 ml. of $n/10$ silver nitrate solution ($10^{116 \ 4}$ mole). After standing for 14 hours at room temperature, the yield amounted to 0.0463 mol of cyclohexanone azine, corresponding to 46.3% of the theoretical yield. The oxidizing agent was present only in a small quantity.

EXAMPLE 3

A solution of 22.8 g of diammonium peroxodisulphate (0.1 mole) dissolved in 100 ml. of water and a solution of 16 g of sodium hydroxide (0.4 mole) dissolved in 100 ml. of water were simultaneously added dropwise over a period of 2 hours at 37°C to a mixture of 200 ml. of concentrated ammonia (2.6 moles), 17.4 g of acetone (0.3 mole) and 1 g of zeolite containing $10^{-4}$ mole of silver ions. After a reaction time of 4 hours, the yield of dimethylketazine amounted to 0.04 mole, corresponding to 40% of the theoretical yield.

was determined after 10 to 20 hours. The yield, quantities of ammonia, acetone and silver nitrate and the temperature of the reaction for several variants are given in the following table I.

TABLE I

| Moles $NH_3$ | Moles acetone | ml. n/10 $AgNO_3$ | Moles NaOH | Temp. °C | Yield in % | Addition |
|---|---|---|---|---|---|---|
| 1.3 | 0.2 | 0.5 | — | 5 | 18.8 | — |
| 1.3 | 0.2 | 0.05 | — | 20 | 13.8 | — |
| 1.3 | 0.3 | 1 | 0.4 | 28 | 38.9 | — |
| 2.6 | 0.2 | 1 | 0.4 | 27 | 41.9 | — |
| 5.2 | 0.3 | 1 | 0.4 | 28 | 52.0 | — |
| 2.6 | 0.5 | 1 | 0.4 | 29 | 56.5 | — |
| 2.0 | 0.3 | 1 | 0.2 | 29 | 21.8 | — |
| 2.6 | 0.3 | 1 | 0.3 | 29 | 50.8 | — |
| 2.6 | 0.3 | 1 | 0.5 | 30 | 39.5 | — |
| 2.6 | 0.3 | 0.5 | 0.4 | 30 | 49.3 | — |
| 2.6 | 0.3 | 3 | 0.35 | 38 | 53.0 | — |
| 2.6 | 0.3 | 3 | 0.35 | 47 | 44.0 | — |
| 6.5 | 1.0 | 3 | 0.35 | 30 | 66.2 | — |
| 2.6 | 0.3 | 10 | 0.35 | 27 | 52.2 | — |
| 2.6 | 0.3 | 1 | 0.35 | 30 | 50.6 | 10 g $Na_2SO_4$ |
| 2.6 | 0.3 | 1 | 0.35 | 27 | 52.0 | 1 g $NaNO_3$ |
| 2.6 | 0.3 | 1 | 0.35 | 30 | 48.2 | 5 g $NH_4F$ |
| 2.6 | 0.3 | 1 | 0.35 | 30 | 47.0 | 10 g $NH_4Ac$ |
| 2.6 | 0.3 | 1 | 0.4 | 29 | 45.0 | 0.1 g Titriplex III |
| 2.6 | 0.3 | 1 | 0.3 | 29 | 47.7 | 10 g KCl |
| 2.6 | 0.3 | 2 | 0.35 | 27 | 45.0 | 10 ml pyridine |

Titriplex III = Disodiumsalt of ethylendiamintetraacetic acid

EXAMPLE 4

A mixture of 22.8 g of diammonium peroxodisulphate (0.1 mole) dissolved in 100 ml. of water and 10.6 g of sodium carbonate (0.1 mole) dissolved in 50 ml. of water, was added dropwise over a period of 4 hours at 29°C to a mixture of 200 ml. of concentrated ammonia (2.6 moles), 14.4 g of acetone (0.3 mole), 10.6 g of sodium carbonate (0.1 mole) dissolved in 50 ml. of water, and 1 ml. of n/10 silver sulphate solution. After 3 hours, the yield of dimethylketazine amounted to 0.0333 mole, corresponding to 33.3% of the theoretical yield.

EXAMPLE 5

A solution of 22.8 g of diammonium peroxodisulphate (0.1 mole) dissolved in 100 ml. of water was added dropwise over a period of 3 hours at 30°C to a mixture of 100 ml. of concentrated ammonia (1.3 moles), 11.6 g of acetone (0,2 mole) and 1 ml. of n/10 rhodium (II) chloride solution ($10^{-4}$ mole). After 20 hours, the yield of dimethylketazine amounted to 0.01 mole, corresponding to 10% of the theoretical yield.

EXAMPLE 6

A mixture of 22.8 g of diammonium peroxodisulphate (0.1 mole) dissolved in 100 ml. of water and sodium hydroxide dissolved in 100 ml. of water, was added dropwise over a period of 1 to 3 hours to a mixture of concentrated 13-molar ammonia, acetone and silver nitrate solution. The yield of dimethyl ketazine

EXAMPLE 7

A mixture of 50 g of dipotassium peroxodisulphate (0.185 mole) and 55 g of 100 % sulphuric acid (Caro's reagent) was neutralized against litmus at 0°C with 20 % sodium hydroxide solution. The peroxomonosulphate solution obtained contain 0.17 mole of peroxomonosulphate in 500 ml. of water was added dropwise over a period of 30 minutes at 15° to 25°C to a mixture of 300 ml. of concentrated ammonia (3.9 mole), 55 g of acetone (0.95 mole) and 5 ml. of n/10 silver nitrate solution. This produced a colorless precipitate which redissolved to some extent. The solution contained 0.1162 mole of ketazine, while the precipitate which was determined separately contained 0.0047 mole of ketazine. The total yield of ketazine amounts to 71.3% of the theoretical yield.

EXAMPLE 8

100 ml. of a 1-N-peroxomonosulphate solution were added dropwise overe a pereiod of 0.5 hour to a mixture of 25% ammonia and pure acetone or other carbonyl compounds. The yield of azine was determined after 1 hour. Two phase systems were extracted with 100 ml. of chloroform, the phases separated and the azine content of both phases determined. In this case, the yield quoted relates to the azine total found. The quantities used, yield and temperature of the reaction for several variants is given in Table II.

TABLE II

| Moles $NH_3$ | Moles of carbonyl compound | Moles of peroxomonosulphuric acid | Temp. (°C) | Yield % of azine based on peroxo compound |
|---|---|---|---|---|
| 0.5 | 0.2 acetone | 0.1 | 30 | 78.5 |
| 0.5 | 0.4 acetone | 0.1 | 30 | 81 |
| 1.0 | 0.4 acetone | 0.1 | 30 | 90 |
| 0.6 | 0.4 acetone | 0.1 | 30 | 84 |

TABLE II – Continued

| Moles NH₃ | Moles of carbonyl compound | Moles of peroxo-monosulphuric acid | Temp. (°C) | Yield % of azine based on peroxo compound |
|---|---|---|---|---|
| 0.5 | 0.4 acetone | 0.1 | 50 | 78 |
| 1.0 | 0.4 isobutyraldehyde | 0.1 | 30 | 53 |
| 0.6 | 0.4 cyclohexanone | 0.1 | 30 | 88 |
| 0.6 | 0.4 benzaldehyde | 0.1 | 30 | 32 |
| 0.6 | 0.4 methylisopropyl-ketone | 0.1 | 30 | 34 |
| 0.6 | 0.4 acetaldehyde | 0.1 | 30 | 48 |
| 0.6 | 0.4 2-butanone | 0.1 | 30 | 72 |
| 0.6 | 0.4 3-pentanone | 0.1 | 30 | 29 |
| 0.6 | 0.4 2-methyl-pentanol-(2)-on-(4) | 0.1 | 30 | 52 |
| 0.6 | 0.4 formaldehyde | 0.1 | 30 | 10 |
| 0.4 | 0.4 acetone + 0.8 mol NH₄Cl | 0.1 | 30 | 63 (+ 15% of diaziridine) |

It will be appreciated that the instant specification and examples are set forth by way of illustration and not limitation, and that various modifications and changes may be made without departing from the spirit and scope of the present invention.

What is claimed is:

1. A process for the production of an azine comprising reacting a carbonyl compound selected from the group consisting of formaldehyde, acetaldehyde, propionaldehyde, butyraldehyde, isobutyraldehyde, valeraldehyde, benzaldehyde, p-chlor-benzaldehyde, acetone, 2-butanone, 2-pentanone, diethylketone, pinacolone, acetylacetone, dibutylketone, cyclohexanone, methylphenylketone, methylisopropylketone, methylcyclohexylketone, dicyclohexylketone, 2-hexanone, 2-heptanone, cycloheptanone, and cyclopentanone, with ammonia and at least one peroxosulphuric acid compound selected from the group consisting of peroxomonosulphuric acid, peroxodisulphuric acid, and the ammonium, alkali metal and alkaline earth metal salts thereof.

2. The process of claim 1 wherein the molar ratio of ammonia to carbonyl compound is between about 1:1 and 20:1 and the molar ratio of ammonia to peroxosulphuric acid compound is between about 2:1 and 200:1.

3. The process of claim 1 wherein the reaction is effected in the presence of about $10^{-7}$ to $10^{-1}$ mol of silver or rhodium per mol of peroxosulphuric acid compound as catalyst.

4. The process of claim 1 wherein the ammonia is introduced in gaseous form at a pressure of up to about 3 atmospheres or as an aqueous solution of about 5 to 25% concentration, and the peroxosulphuric acid compound is introduced in solid form or as an aqueous solution of about 0.01 to 3 mols per liter, the reaction being effected at a temperature between about −10° to 70°C.

5. The process of claim 1 wherein the peroxosulphuric acid is peroxodisulphuric acid and the reaction is effected in the presence of about 0.01 to 10 mols of an inorganic base per mol of peroxodisulphuric acid compound.

6. The process of claim 5 wherein the peroxodisulphuric acid salt is the sodium or potassium salt and the inorganic base is sodium or potassium hydroxide or carbonate.

7. The process of claim 1, wherein the molar ratio of ammonia to carbonyl compound is between about 2:1 and 15:1, the molar ratio of ammonia to peroxosulphuric acid compound is between about 3:1 to 30:1, the reaction is effected in the presence of about $10^{-5}$ and $10^{-2}$ mol of silver or rhodium per mol of peroxosulphuric acid compound as catalyst, the ammonia is introduced in gaseous form at a pressure of up to about 3 atmospheres or as an aqueous solution of about 5 to 25% concentration, and the peroxosulphuric acid compound is introduced in solid form or as an aqueous solution of about 0.01 to 3 mols per liter, the reaction being effected at a temperature between about 10° to 60°C.

* * * * *

UNITED STATES PATENT OFFICE
CERTIFICATE OF CORRECTION

PATENT NO. : 3,892,805
DATED : July 1, 1975
INVENTOR(S) : Kurt-Wilhelm Eichenhofer and Reinhard Schliebs It is certified that error appears in the above-identified patent and that said Letters Patent are hereby corrected as shown below:

Col. 2, line 47, compound I of the formulae, cancel and substitute the following:

Col. 5, line 41, cancel compound (III) and substitute the following:

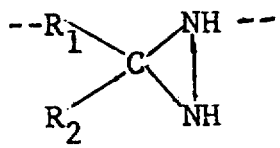

Col. 5, line 56, in the equation, cancel "-(H )" and substitute -- $-(H^+)$ --.

Col. 6, line 53, Cancel " $(10^{116}\ ^4 mole)$ " and substitute -- $(10^{-4}\ mole)$ --.

Signed and Sealed this twenty-eight Day of October 1975

[SEAL]

Attest:

RUTH C. MASON
*Attesting Officer*

C. MARSHALL DANN
*Commissioner of Patents and Trademarks*